United States Patent
Chang et al.

(10) Patent No.: US 7,188,965 B2
(45) Date of Patent: Mar. 13, 2007

(54) BACKLIGHT ASSEMBLY WITH OPTICAL FILM HAVING POSITIONING FLANGE

(75) Inventors: Che-Chih Chang, Taichung (TW); Chi-Chung Lo, Yongjing Township, Changhua County (TW)

(73) Assignee: AU Optronics Corp., Hsinchu (TW)

( * ) Notice: Subject to any disclaimer, the term of this patent is extended or adjusted under 35 U.S.C. 154(b) by 185 days.

(21) Appl. No.: 10/902,943

(22) Filed: Aug. 2, 2004

(65) Prior Publication Data

US 2005/0195621 A1    Sep. 8, 2005

(30) Foreign Application Priority Data

Mar. 3, 2004   (TW) ................................ 93105611 A

(51) Int. Cl.
   *G09F 13/08*   (2006.01)
(52) U.S. Cl. ........................................ 362/97; 362/627
(58) Field of Classification Search ................ 362/627, 362/628, 633, 634; 40/575; 349/58, 65
   See application file for complete search history.

(56) References Cited

U.S. PATENT DOCUMENTS

| | | | | |
|---|---|---|---|---|
| 6,055,029 A | * | 4/2000 | Kurihara et al. | 349/58 |
| 6,068,381 A | * | 5/2000 | Ayres | 362/633 |
| 6,835,961 B2 | * | 12/2004 | Fukayama | 349/59 |
| 2002/0030983 A1 | * | 3/2002 | Chou | 362/633 |
| 2002/0093811 A1 | * | 7/2002 | Chen | 362/628 |
| 2002/0167626 A1 | * | 11/2002 | Matsuda et al. | 349/65 |
| 2003/0133207 A1 | * | 7/2003 | Minami et al. | 349/58 |
| 2004/0257791 A1 | * | 12/2004 | Chen et al. | 362/628 |
| 2006/0007367 A1 | * | 1/2006 | Cho | 349/58 |

FOREIGN PATENT DOCUMENTS

JP    2003-043456    2/2003

* cited by examiner

*Primary Examiner*—Sandra O'Shea
*Assistant Examiner*—Ismael Negron
(74) *Attorney, Agent, or Firm*—Rabin & Berdo, PC

(57) ABSTRACT

A backlight assembly includes a frame, a light source, and at least one optical film. The light source is disposed on the frame. The optical film has at least one positioning flange. The positioning flange includes at least two contact edges configured to abut against at least one edge of the frame in at least two directions to hold the optical film in place relative to the frame.

14 Claims, 5 Drawing Sheets

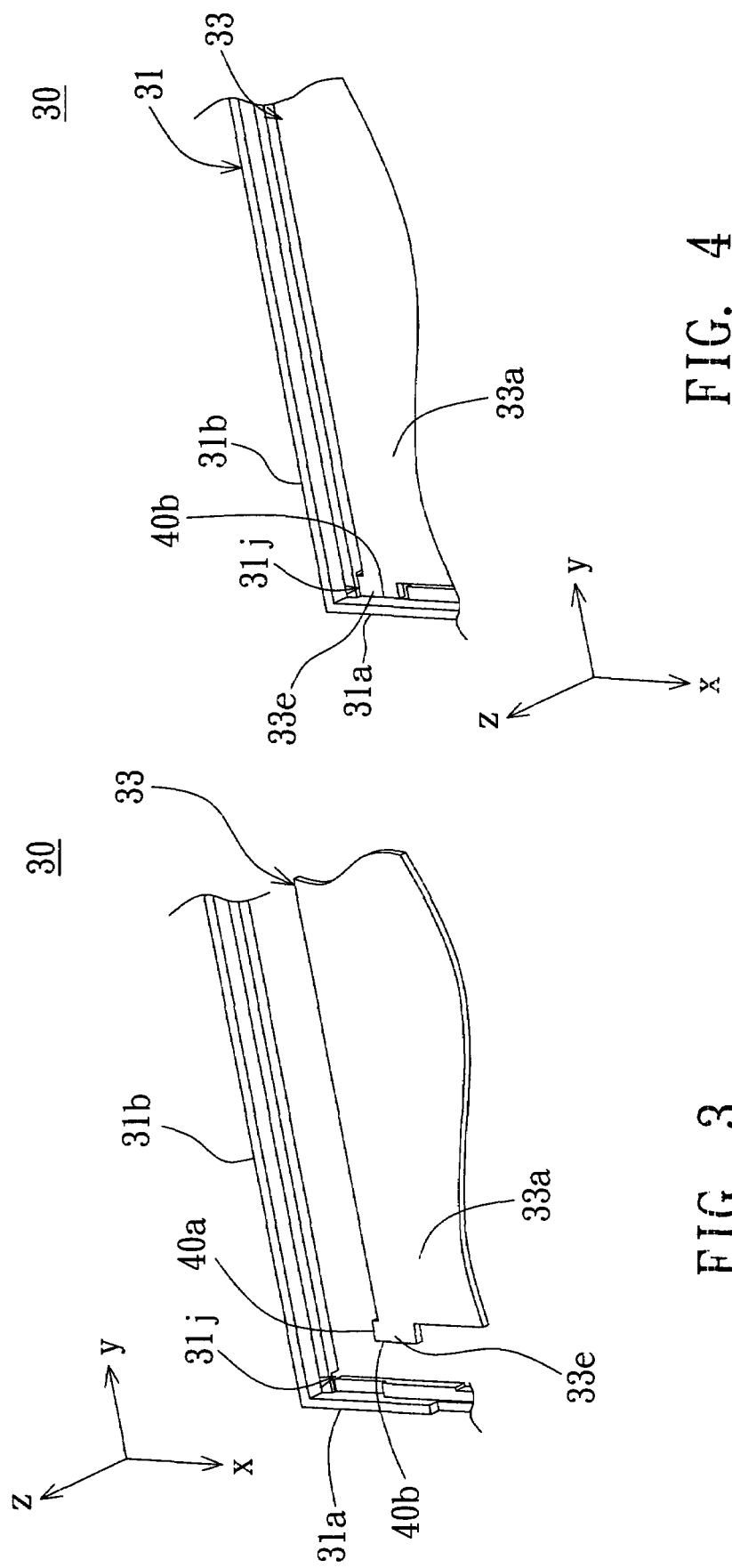

BACKLIGHT ASSEMBLY WITH OPTICAL FILM HAVING POSITIONING FLANGE

This application claims the benefit of Taiwan application Serial No. 093105611, filed Mar. 3, 2004, the subject matter of which is incorporated herein by reference.

BACKGROUND OF THE INVENTION

1. Field of the Invention

The invention relates in general to a backlight assembly, and more particularly to a backlight assembly whose optical films are held in the frame while the positioning flanges of the optical films are configured to abut against the edges of the frame in a number of directions.

2. Description of the Related Art

Featured by the advantages of having a light weight slim appearance, low power consumption and low radiation, the liquid crystal display (LCD) has gained a rapid advance in manufacturing technology and has been widely applied in electronic devices such as the personal digital assistant (PDA), notebook, digital still camera, digital video recorder, mobile phone, computer monitor and TV screen. Further, due to the long-term R&D investment and the adoption of large-scale manufacturing facilities, the quality of LCD device continues to improve while the price continues to decline. Consequently, the application of LCD is growing wider and wider. Since the display panel of an LCD is not self-luminous, a backlight assembly is required to provide necessary light for the display panel.

Referring to FIG. 1A, a diagram of a conventional backlight assembly is shown. In FIG. 1A, a backlight assembly 10 includes a frame 11, a light guide plate 12 and one or more optical films 13, wherein the bottom surface of the optical film 13 can be adhered to the top surface of the light guide plate 12 by means of adhesive tape (not shown in FIG. 1A). One lateral side of the optical film 13 has flanges 13a and 13b; wherein the flanges 13a and 13b respectively have openings 13c and 13d for respective bolts 15a and 15b to pass through. The optical film 13 is fixed to the frame 11 by inserting the bolts 15a and 15b through the openings 13c and 13d and screwing the bolts 15a and 15b into respective screw holes (not shown in FIG. 1A) in the frame 11.

Referring to FIG. 1B, another diagram of a conventional backlight assembly is shown. In FIG. 1B, a backlight assembly 20 includes a frame 21, a light guide plate (not shown in FIG. 1B) and one or more optical films 23, wherein the light guide plate 22 and the optical film 23 are both fixed within. The frame 21 has hooks 21a and 21b. One lateral side of the optical film 23 has flanges 23a and 23b, while the other lateral side of the optical film 23 has flanges 23e and 23f, wherein the flanges 23a and 23b. The flanges 23a and 23b have openings 23c and 23d for the respective bolts 25a and 25b to pass through. The flanges 23e and 23f respectively have openings 23g and 23h. The flanges 23e and 23f are fastened to the frame 21 by seating the openings 23g and 23h wherein the openings 23g and 23h can be hooked to the hooks around the respective hooks 21a and 21b. When the bolts 25a and 25b, inserted through the respective openings 23c and 23d, are screwed in respective screw holes in the frame 21 (not shown in FIG. 1B) and the openings 23g and 23h are hooked to the hooks 21a and 21b, the optical film 23 will be fixed to the frame 11.

It can be seen from the above disclosure that the conventional optical film is fixed to the frame by means of securing parts such as adhesive tape, bolts or hooks. Consequently, the additional securing parts increase the production cost, and are time-consuming to fasten. Moreover, since the conventional method according to FIG. 1A cannot fix the whole optical film precisely, the optical film is easily wrinkled, leading to a significant deterioration of luminance quality. According to the conventional method, the openings for securing the screws around the hooks are formed by punching holes in an optical film. However, the scraps of optical film obtained from punching cannot be recycled, and it is wasteful to throw away those scraps of optical film. Another problem is that the more flanges that are used the more likely light leakage will occur. Although the flanges 23e and 23f can be covered by shielding tape to reduce light leakage, additional tape costs are incurred. Furthermore, it is very difficult to separate the optical film from the light guide plate, because the optical film is tightly adhered to the light guide plate by adhesive tape.

SUMMARY OF THE INVENTION

It is therefore an object of the invention to provide a backlight assembly, which fixes an optical film in at least two directions by using a number of contact edges of each of the positioning flanges of the optical film to abut against at least one edge of the frame in at least two of directions. The invention not only improves the reliability of fixing the optical film but also avoids serious light leakage caused if too many flanges are used. Besides, no additional securing parts such as bolts or hooks are needed in the invention, so the expenditures for parts can be reduced. Moreover, no opening is required to be formed in the optical film, so material waste also can be reduced.

To satisfy this object of the invention, a backlight assembly including a frame, a light source, and at least one optical film is provided. The light source is disposed on the frame. The optical film has at least one positioning flange. The positioning flange includes at least two contact edges configured to abut against at least one frame side or member in at least two directions to hold the optical film in place relative to the frame.

According to another object of the invention, an optical film disposed on a frame is provided. The optical film includes a light incident surface and at least one positioning flange. The positioning flange includes at least two contact edges configured to abut against at least one frame side in at least two directions to hold the optical film in place relative to the frame.

Other objects, features, and advantages of the invention will become apparent from the following detailed description of the preferred but non-limiting embodiments. The following description is made with reference to the accompanying drawings.

BRIEF DESCRIPTION OF THE DRAWINGS

FIG. 3 is a exploded view partially showing the optical film and frame in FIG. 2;

FIG. 4 is a perspective view of the optical film mounted to the frame in FIG. 3;

DETAILED DESCRIPTION OF THE INVENTION

Figure 1A:
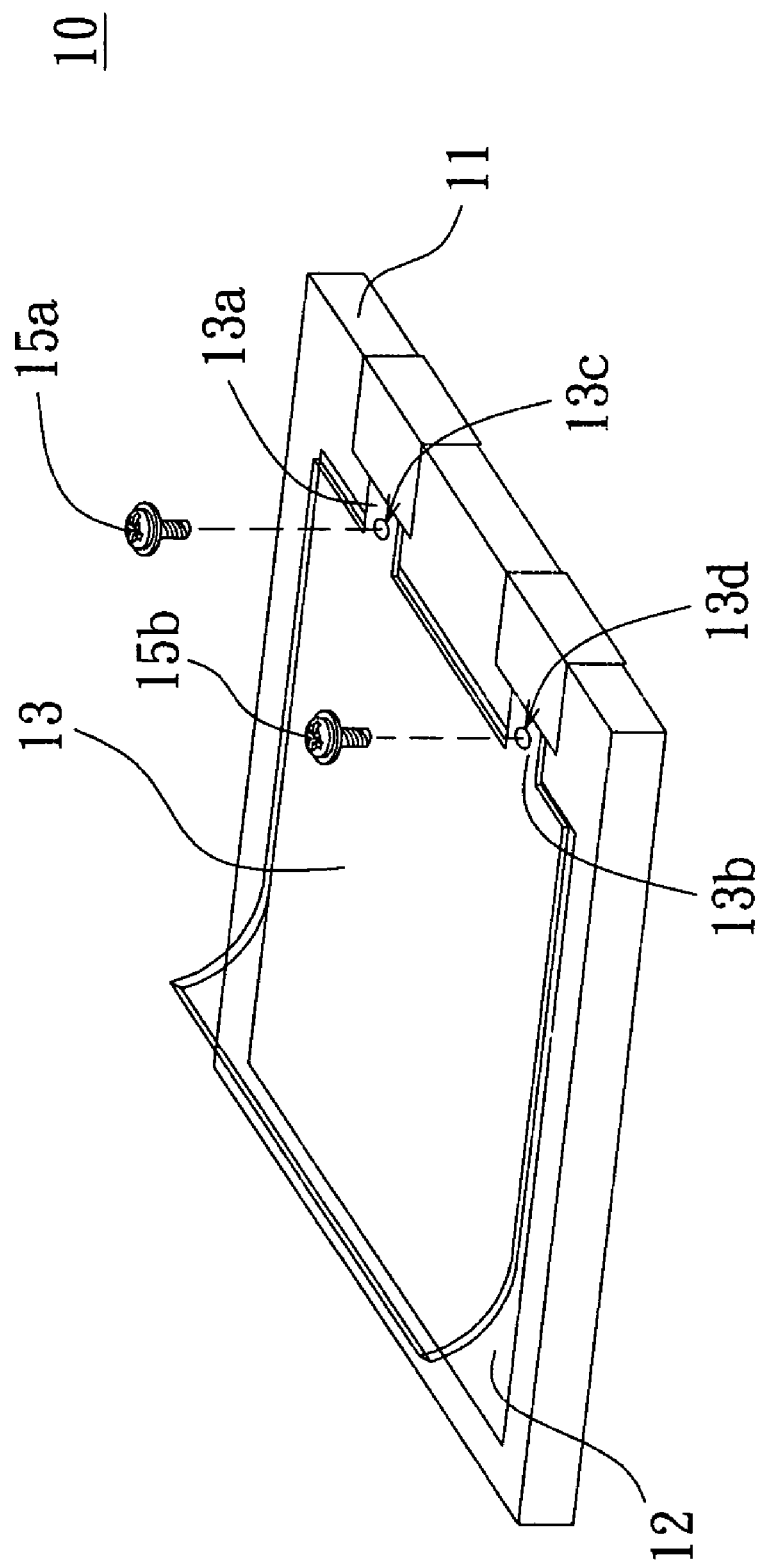
FIG. 1A is a diagram of a conventional backlight assembly.
Figure 1B:
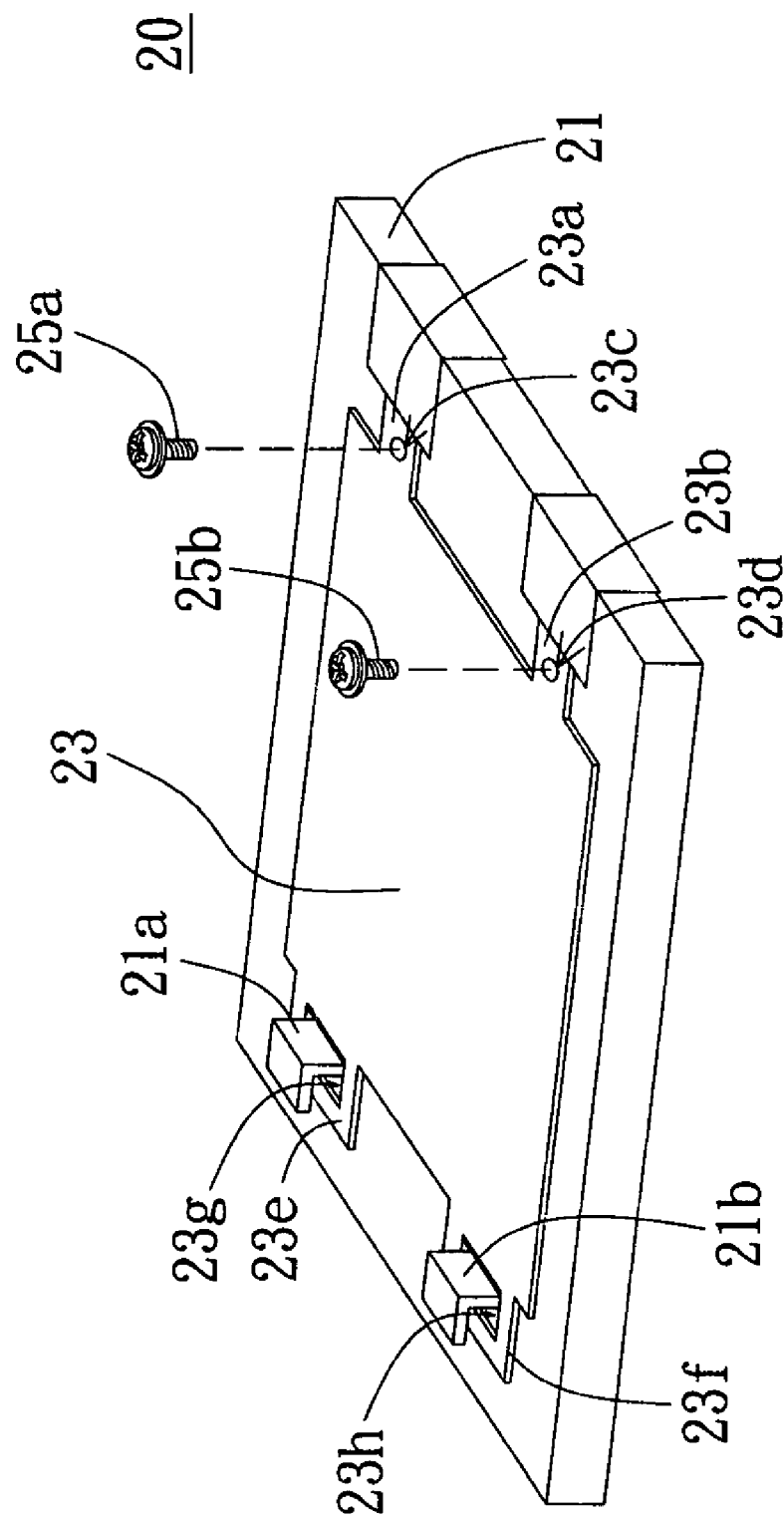
FIG. 1B is another diagram of a conventional backlight assembly.
Figure 2:
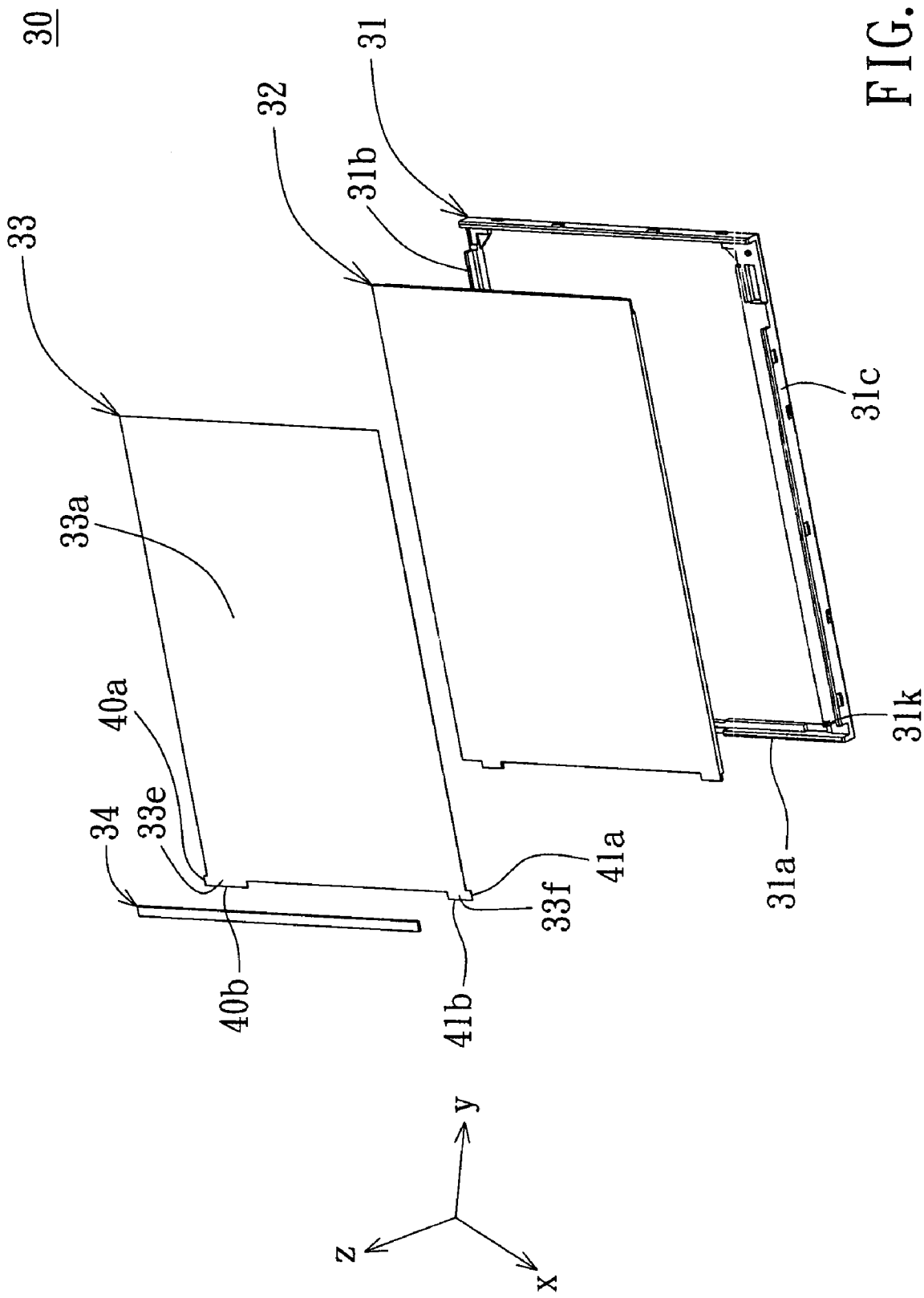
FIG. 2 is a exploded view of a backlight assembly according to the preferred embodiment of the invention.

Please refer to FIGS. 2~4 at the same time. FIG. 2 is an exploded view of a backlight assembly according to the preferred embodiment of the invention; FIG. 3 is an exploded view partially showing the optical film and frame in FIG. 2; and FIG. 4 is a perspective view of the optical film mounted to the frame in FIG. 3. In FIG. 2, a backlight assembly 30 includes a frame 31, a light guide plate 32, a light-shielding layer 34, and at least one optical film. An optical film 33 is exemplified in the disclosure of the invention. The frame 31 at least includes frame sides 31a, 31b and 31c, wherein the frame side 31a connects the two frame sides 31b and 31c. The frame has a rectangular accommodating area for receiving the optical film. The accommodating area is bounded by side borders defined by the inner edges of the frame sides such as sides 31a, 31b and 31c, which intersect at four corners. The light source disposed on the frame 31 of the backlight assembly 30 is located under a surface of the light guide plate 32 or located at a side of the light guide plate 32.

The optical film 33 includes a light incident surface 33a and at least one positioning flange, wherein the positioning flange is disposed on the peripheral of the light incident surface 33a. Each of the positioning flanges has at least one contact edge for abutting against at least one side of the frame 31 in different directions such as two perpendicular directions. In practical application, the shape of the positioning flange is polygonal. In this embodiment of the invention, the rectangular positioning flanges 33e and 33f are exemplified for illustrating the optical film 33 mounted to the frame 31. Moreover, the shape of the optical film 33 approximates a rectangle or a polygon in practical applications, and is exemplified by the rectangular optical film 33 in the present preferred embodiment. Additionally, the positioning flanges 33e and 33f are disposed at two consecutive (adjacent) corners of the optical film 33. If the light incident surface 33a is regarded as the main body of the optical film 33, the contact edges 40a and 40b of the positioning flange 33e form a shoulder of the optical film 33, and the contact edges 41a and 41b of the positioning flange 33f form the other shoulder of the optical film 33.

Please refer to FIG. 3 and FIG. 4. The contact edges 40a and 40b of the positioning flange 33e abut against the respective sides 31b and 31a of the frame 31 in two perpendicular directions, while the positioning flange 33e is inserted into a positioning recess 31j of the frame side or frame member 31b. Similarly, the contact edges 41a and 41b of the positioning flange 33f (FIG. 2) abut against the respective frame sides 31c and 31a in a number of directions, while the positioning flange 33f is inserted into a positioning recess 31k in the frame side 31c. As can be seen in FIG. 3 at 31j, the recesses project outwardly of the adjacent borders of both sides 31a and 31b bounding the accommodating area of the frame (the inner edges of the frame sides). Accordingly, the optical film 33 is fixed to the frame 31 in at least two directions, the x-direction and the y-direction for instance. Besides, the light-shielding layer 34, as shown in FIG. 2, is used for covering the positioning flanges 33e and 33f of the optical film 33 to prevent light leakage from occurring.

Figure 5:
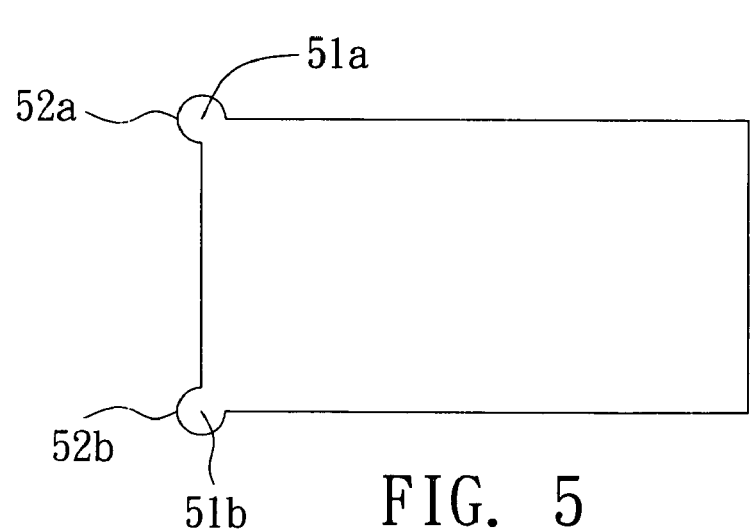
FIG. 5 is a plane view of an optical film with two round positioning flanges.
Figure 6:
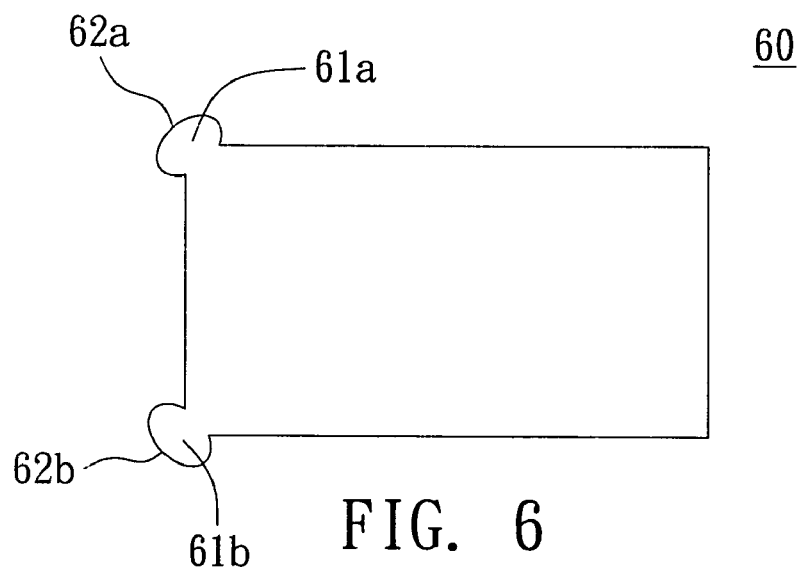
FIG. 6 is a plane view of an optical film with two oval positioning flanges.
Figure 7:
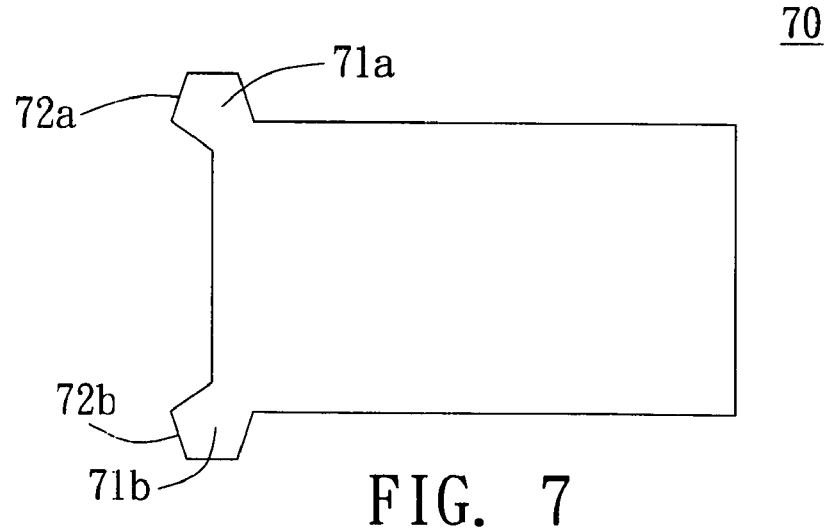
FIG. 7 is a plane view of an optical film with two pentagonal positioning flanges.

However, anyone who is skilled in the art will realize that the technique of the invention is not limited thereto. For example, the light-shielding layer 34 can be replaced by light-shielding adhesive tape or a light-shielding rib to cover the positioning flanges 33e and 33f of the optical film 33. Also, the positioning flange of the optical film can be round, oval, pentagonal, or in another shape. In FIG. 5, an optical film 50 has two round positioning flanges 51a and 51b, wherein the contact edge 52a of the positioning flange 51a abuts against at least one corresponding frame side in a number of directions and the contact edge 52b of the positioning flange 51b abuts against at least one corresponding frame side in a number of directions. In FIG. 6, an optical film 60 has two oval positioning flanges 61a and 61b, wherein the contact edge 62a of the positioning flange 61a abuts against at least one corresponding frame side in a number of directions and the contact edge 62b of the positioning flange 61b abuts against at least one corresponding frame side in a number of directions. In FIG. 7, an optical film 70 has two pentagonal positioning flanges 71a and 71b, wherein the contact edge 72a of the positioning flange 71a abuts against at least one corresponding frame side in several directions and the contact edge 72b of the positioning flange 71b abuts against at least one corresponding frame side in several directions.

Although two positioning flanges of the optical film are exemplified in the preferred embodiment of the invention, the object of fixing the optical film to the frame can be achieved by using only one positioning flange, as long as the contact edges of the positioning flange disposed at the optical film abut against the frame side in a number of directions. Besides, if a couple of optical films have to be fixed to the frame, only the optical film placed on the top needs to have one or more positioning flanges for abutting against the frame side; in other words, there is no need for each optical film to have positioning flanges.

According to the aforementioned description, the backlight assembly disclosed in the preferred embodiment, which uses a number of contact edges of one or more positioning flanges of at least one optical film to abut against at least one frame side in a number of directions to hold the optical film in place relative to the frame, not only improves the reliability of fixing the optical film to the frame but also avoids serious light leakage if too many flanges are disposed on the optical film. Besides, no additional securing parts such as bolts or hooks for the fixation of the optical film are needed in the invention, so the expenditures for securing parts can be reduced. Moreover, no opening is required to form in the optical film, and material waste can be further reduced.

While the invention has been described by way of examples and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A backlight assembly, comprising:
   a frame;
   a light source disposed on the frame;
   at least one optical film having a shape that approximates a rectangle, and having two positioning flanges located at two adjacent corners, and at a same side of the optical film, wherein each positioning flange includes at least two contact edges configured to abut against at least one edge of the frame in at least two directions to hold the optical film in place relative to the frame; and a light-shielding layer for covering the positioning flanges of the optical film.

2. The backlight assembly according to claim 1, wherein the optical film and the positioning flanges are formed in a single body.

3. The backlight assembly according to claim 1, wherein each positioning flange located at one corner of the optical film forms a shoulder profile.

4. The backlight assembly according to claim 1, wherein the shape of each positioning flange is a polygon.

5. The backlight assembly according to claim 1, wherein the contact edges of each positioning flange are oriented to oppositely abut corresponding edges of the frame in two perpendicular directions to hold the optical film in place relative to the frame.

6. The backlight assembly according to claim 5, wherein the frame has a rectangular accommodating area, having four side borders and corners at intersections of said side borders, configured to receive the optical film, the frame having a recess projecting outwardly of the side borders into sides of the frame in perpendicular directions from at least one of the corners, each positioning flange being received in the one of the corners so that the contact edges of the positioning flange are oriented to abut respective edges of the frame in the recess in two perpendicular directions to hold the optical film in place relative to the frame.

7. A backlight frame structure comprising:

a polygonal accommodating area, bounded by at least four side borders including first, second and third side borders, configured to receive at least one optical film of corresponding shape, wherein the first side border has a first end and a second end and the second and third side borders intersect the first border respectively at the first end and the second end;

first, second and third frame members formed along the first, second and third side borders, respectively;

a first recess at the intersection of first and second side borders projecting into the first and second frame members, outwardly of both said first side border and said second side border; and a second recess at the intersection of first and third side borders projecting into the first and third frame members, outwardly of both said first side border and said third side border, wherein said first recess and said second recess are shaped to receive a correspondingly shaped flange of the optical film, edges of the frame members bounding the first and second recesses, oriented to oppositely abut against contact edges of the flange of the optical film in at least two directions to hold the optical film in place relative to the frame.

8. The backlight frame structure according to claim 7, wherein the contact edges of the frame members bounding the first and second recesses are oriented to abut against the contact edges of the flange in two perpendicular directions to hold the optical film in place relative to the frame.

9. The backlight frame structure according to claim 7, wherein the correspondingly shaped flange of the optical film is located at a corner of the optical film and forms a shoulder profile.

10. The backlight frame structure according to claim 7, wherein the shape of the correspondingly shaped flange is a polygon.

11. The backlight frame structure according to claim 7, wherein the shapes of the accommodating area and the optical film approximate a rectangle.

12. The backlight frame structure according to claim 7, wherein the optical film and the flange are formed in a single body.

13. The backlight frame structure according to claim 7, wherein the optical film comprises two flanges located at two adjacent corners of the optical film.

14. The backlight frame structure according to claim 13, wherein the flanges are located at the same side of the optical film.

* * * * *